Jan. 9, 1951           A. J. GRETSCHEL           2,537,750
DETACHABLE HANDLE FOR SUITCASES OR OTHER ARTICLES
Filed March 18, 1949           2 Sheets-Sheet 1
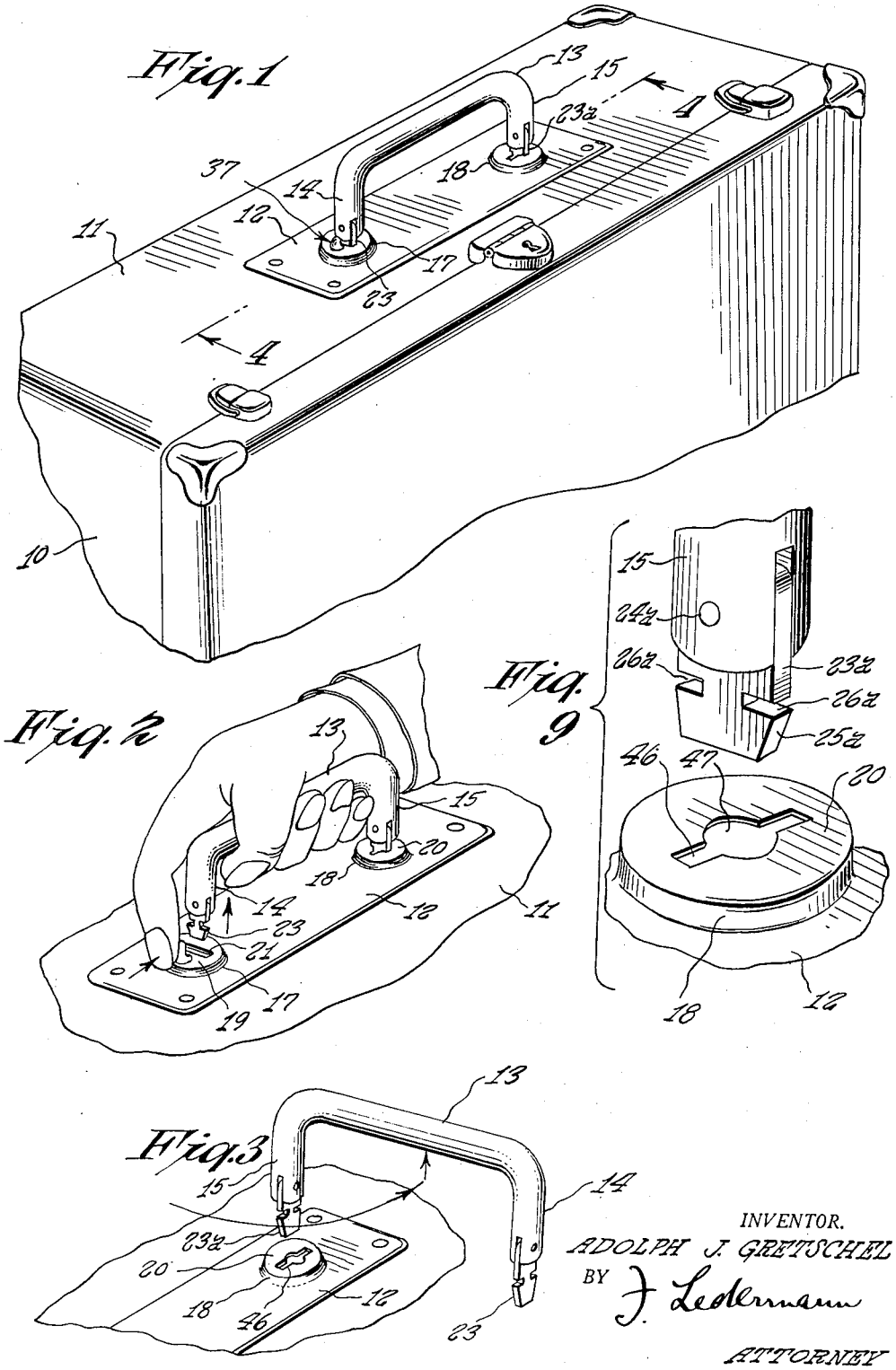
INVENTOR.
ADOLPH J. GRETSCHEL
BY J. Lederman
ATTORNEY Jan. 9, 1951 A. J. GRETSCHEL 2,537,750
DETACHABLE HANDLE FOR SUITCASES OR OTHER ARTICLES
Filed March 18, 1949 2 Sheets-Sheet 2
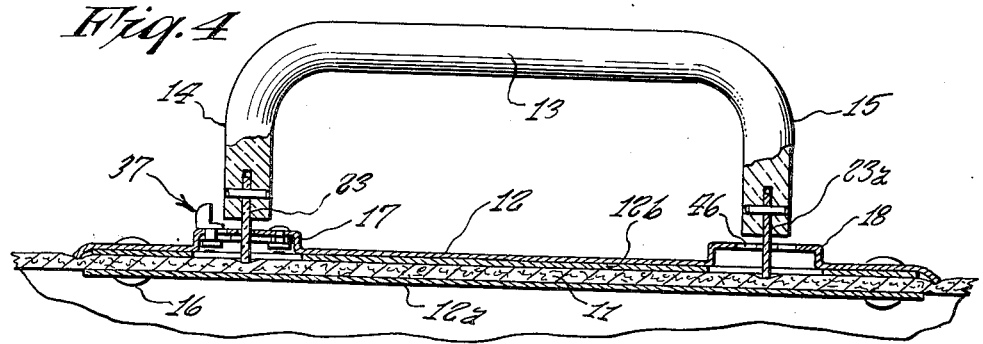
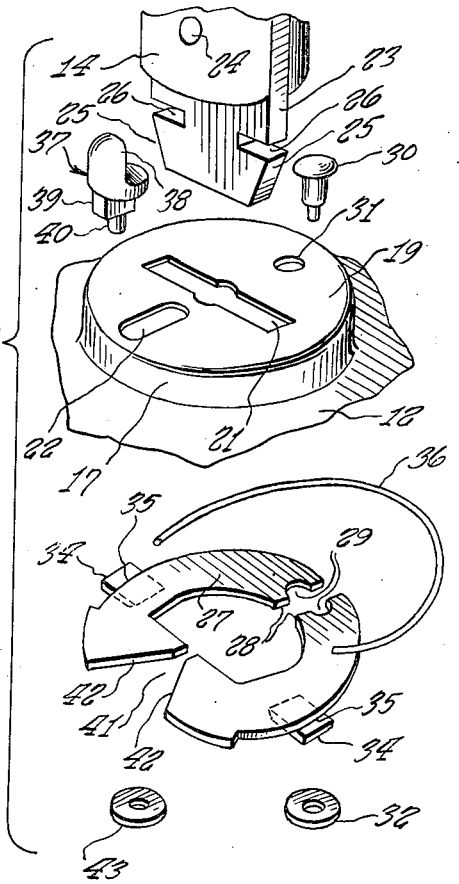
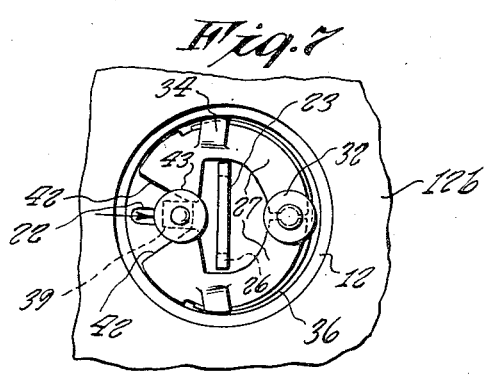
INVENTOR.
ADOLPH J. GRETSCHEL
BY J. Lederman
ATTORNEY Patented Jan. 9, 1951

2,537,750

UNITED STATES PATENT OFFICE 2,537,750

DETACHABLE HANDLE FOR SUITCASES OR OTHER ARTICLES

Adolph J. Gretschel, Long Island City, N. Y.

Application March 18, 1949, Serial No. 82,063

6 Claims. (Cl. 190—58)

This invention relates to handles for suitcases, handbags, trunks, and other articles, and one object is the provision of a novel, simple and efficient detachable handle for such articles.

Another object of the invention is the provision of a detachable handle and means partly on the handle and partly on the suitcase or other article, which permit of quick detaching or reattaching of the handle with a minimum of simple and quick movements using only one hand.

The above broad as well as additional and more specific objects will become apparent in the following description, wherein reference numerals refer to like-numbered parts in the accompanying drawings. It is to be noted that the drawings are intended solely for the purpose of illustration, and that it is therefore neither desired nor intended to limit the invention necessarily to any or all of the exact details of construction shown except insofar as they may be deemed essential to the invention.

Referring briefly to the drawings,

Fig. 1 is a fragmentary perspective view of a suitcase having the detachable handle of this invention applied thereto.

Fig. 2 is a fragmentary enlargement of Fig. 1, showing the manner of detaching the handle, in the initial stage of the detaching operation.

Fig. 3 is a similar fragmentary enlargement of Fig. 1, showing the handle completely detached and in the position it occupies when the detaching operation is completed.

Fig. 4 is a sectional view taken on the line 4—4 of Fig. 1.

Fig. 5 is a fragmentary enlargement of Fig. 4, showing the finger-manipulated slide in the position in which it releases the front end of the handle.

Fig. 6 is a bottom plan view looking in the direction of the arrows 6—6 of Fig. 5, showing the said slide in its normal or locking position wherein it locks the front end of the handle to the case.

Fig. 7 is a view similar to Fig. 6 except that it shows the said slide in the releasing position indicated in Fig. 5.

Fig. 8 is a combination perspective view of the associated details of the front end of the handle and the corresponding cooperating portion of the member attached to the suitcase, each of the details being spaced from the adjacent details in order to illustrate them with a maximum of clarity.

Fig. 9 is a similar combination perspective view of the rear end of the handle and the corresponding cooperating portion of the said member attached to the suitcase.

Referring in detail to the drawings, the numeral 10 indicates, by way of example, a suitcase whose top 11 is provided with a plate or the like 12 for the purpose of securing a handle 13 to the case. For the purpose of this description, the leg 14 of the handle will be referred to as the front end or leg of the handle, and the leg 15 will be referred to as the rear leg or end. To more durably attach the plate 12 to the top 11, it is desirable that a plate 12a of similar dimensions be positioned under the top 11, the latter then being clamped between the plates 12 and 12a by means of, for example, rivets 16. A filler plate or layer 12b may moreover be provided under and in contact with the plate 12, and this filler may be of any suitable material, including metal.

Raised hollow bosses 17 and 18 are provided on the plate 12, spaced as shown, having flat upper surfaces or tops 19 and 20, respectively. The boss 17 is provided with a transverse slot 21 in its top 19 and a longitudinal slot 22 in the said top 19 between the slot 21 and the forward edge of the boss. The lower end of the front leg 14 of the handle is bifurcated, and between the bifurcations thereof a tongue 23 is pivoted on a pin 24. The lower end of the tongue 23 has its two opposed lateral edges 25 beveled to provide a taper on the tongue, and between the tapered end and the adjacent body of the tongue opposed notches 26 are cut into the tongue. It is now apparent that the front end 14 of the handle may be lowered to insert the tapered end of the tongue into the slot 21, into the position shown in Figs. 4 and 5.

Within the boss 17 and substantially flush with the underside of the top 19, are mounted, in the positions shown in Figs. 5, 6 and 7, a pair of complementary flat arched members 27 which together may be termed a split U, the split occurring at the base of the U. The opposed edges 28 at this split are cut away intermediate their length to provide the two complementary halves 29 of a circle. A rivet 30, shown in Fig. 8 as it appears prior to having its lower end flattened and spread, passes through a hole 31 at the rear of the boss 17, then through the circle formed by the complementary semi-circular cut-outs 29, then through a washer 32, and, after the lower end of the rivet has been spread as shown at 33 to retain the washer in place, the washer holds the rear end of the U 27, 27 against the boss top 19. Each arm 27 of the U has provided on its underside near the forward end thereof a lug 34, thus forming a shoulder 35. A U-shaped length of spring wire 36 is positioned in the same plane as the member 27, 27, with its intermediate portion supported on the washer 32 and its outer ends registering substantially in the shoulders 35 and being supported by the lugs 34.

A slide 37 comprising a finger piece 38 having an intermediate body portion 39, rectangular in cross-section, and a pin at the lower end thereof, shown at 40, is slidably mounted in the slot 22 by registration therein of the intermediate portion 39. After the slide 37 is thus positioned in the slot 22, it extends through the notch or space 41 between the angular edges 42 of the arms 27. Then a washer 43 is slipped over the pin 40 and the lower end of the pin is spread into a head 44 to hold up the washer; thus, the washer 43 holds up the front ends of the arms 27 against the boss roof 19, and the intermediate body 39 of the slide 37 is movable in the plane of the arms 27, 27, to and fro from left to right and vice versa, Figs. 6 and 7. As the edges 42 provide cams engaging the slide portion 39, and as the arms of the spring 36 are normally urged together and consequently normally urge the arms 27 together at their free ends, the cam action of the edges 42 against the body 39 normally force the latter to the left-hand end of the slot 22. The normal action of the spring 36 thus also brings the two arms 27 as close together as possible, that is, until the rearward ends of the edges 42 come into contact with each other. In the latter or normal positions of the arms 27, with the handle tongue 23 in position, as shown in Fig. 5, in the slot 21, the juxtaposed inner edges of the arms 27 register in the opposed notches 26 of the tongue 23, thus locking the latter against the plate 12. It is apparent that, owing to the tapering edges 25 of the tongue 23, upon insertion home of the tongue 23 into its slot 21 the beveled edges of the tongue will force the arms 27 apart until the notches 26 are positioned in the plane of the arms 27 whence the spring 36 will force the arms 27 into the notches 26. It is also apparent that when the slide 37 is moved to the right, as shown in Fig. 5, the slide body 39 will travel from its position in Fig. 6 to its position in Fig. 7, thus spreading the arms 27 and withdrawing the latter from the notches 26 of the tongue 23 so that the latter may be lifted out of the boss slot 21.

The rear handle leg 15 is bifurcated in the same manner as the front leg 14, and is also provided with a pivoted tongue 23a mounted on a pin 24a. Other features of the tongue 23a, which are similar to those of the tongue 23, bear the same reference numeral followed by the subscript *a*. It is thus obvious that the legs 14 and 15 of the handle 13 are in all respects similar and interchangeable.

The rear boss 18 has a longitudinal slot 46 through its roof 20, and the mid-portion of this slot is widened circularly to provide a passage 47. It is apparent that when the handle is in the position shown in Fig. 3, the tongue 23a may be inserted into the slot 46, and upon rotation of the handle about the leg 15 in a clockwise direction, with the opposed edges of the slot 46 registering in the notches 26a, to the position shown in Fig. 2, the leg 15 will be releasably locked in the boss 18.

Assuming that the suitcase has been carried to a location where it is desired to set it down and leave it for a short time, as may be the case in a railroad terminal, the handle is first removed. The procedure in removing the handle is shown in successive steps in Figs. 2 and 3. Grasping the handle in one hand and using one finger to move the slide 37 toward the handle, the tongue 23, as previously described, is released from the arms 27 so that the handle may be swung into the position shown in Fig. 2. From that position the handle is swung to a position at right angles thereto, following the direction of the arrow, Fig. 3, into the position shown in Fig. 3, whence the leg 15 may readily be removed from the slot 46. To insert the handle into the suitcase, the steps are reversed, and after the handle has then been swung into the position shown in Fig. 2, pushing down the front leg 14 is all that is required, as the beveled edges 25 of the tongue 23 will spread the arms 27, as previously described, until the latter snap into the notches 26 and thus lock the leg 14 in the boss 17.

Obviously, modifications in form or structure may be made without departing from the spirit or scope of the invention.

I claim:

1. In combination with an article having a wall, a support secured to said wall and having a pair of spaced bosses thereon, said bosses being hollow and having roofs substantially parallel with said wall, one of said roofs having a slot therethrough substantially in alignment with an imaginary line joining said bosses, the other of said roofs having a slot therethrough substantially at right angles to said imaginary line, a handle having tongues extending from the ends thereof, said tongues lying in substantially parallel planes and each having substantially the same cross-sectional conformation as one of said slots so that each of said tongues is insertible into one of said slots, one of said tongues having aligned notches in the opposed lateral edges thereof, said first-named slot having a widened portion intermediate its length of substantially the same diameter as the distance between the inner walls of said aligned notches, said handle being secured to said support by insertion of said one of said tongues into said first-named slot to a depth wherein said notches lie in the plane of the roof containing said first-named slot and rotation of said handle through an arc of substantially ninety degrees to position the other of said tongues directly over said second-named slot and insertion of said other of said tongues into said second-named slot, and means partly on said other of said tongues and partly on the boss containing said second-named slot for releasably locking said other of said tongues in said last-named boss.

2. The combination set forth in claim 1, said tongues being pivotally mounted on said ends of the handle on axes at right angles to the planes of said tongues.

3. The combination set forth in claim 1, said means comprising an arm pivotally mounted under said last-named roof on an axis spaced from the plane through said second-named slot, resilient means normally urging said arm to swing in a direction from one end of said second-named slot toward the middle thereof, limit stop means restricting the swinging of said arm through a distance equal to less than the total length of said second-named slot, said other of said tongues having a notch in that lateral edge thereof adjacent said arm when the tongue is in the securing position, said resilient means thereby normally urging said arm to register in said last-named notch, and manual means for swinging said arm in the opposite direction along said second-named slot to disengage said arm from said last-named notch.

4. The combination set forth in claim 1, said means comprising a pair of opposed substantially semi-circular arms positioned under the roof of said last-named boss in a plane parallel with said roof, one pair of the juxtaposed ends of said arms having complementary indentation therein, a pivot pin secured in said last-named roof and passing through said complementary indentation thereby providing a common pivot for said arms, said pin having a head on the lower end thereof supporting said ends of said arms in said last-named plane, the free ends of said arms being cut away along approximately radial lines thereby providing edges thereon at an acute angle with respect to each other, said last-named boss having an additional slot through the roof thereof at right angles to said second-named slot, a slide mounted in said additional slot and projecting above and below said lost-named roof, the downwardly projecting portion of said slide extending between said edges of said arms, resilient means normally urging the free ends of said arms toward each other and hence normally urging said edges of said arms against said downwardly projecting portion of said slide, said other of said tongues having opposed notches in the lateral edges thereof, said arms with said other of said tongues inserted into said second-named slot registering in said last-named notches, said free ends of said arms normally urging said slide radially outward so that manual movement of said slide radially inward spreads said free ends of said arms and withdraws said arms from said second-named notches.

5. The combination set forth in claim 4, that portion of said slide registering in said additional slot having a rectangular cross-section thereby constraining said slide against rotational movement.

6. The combination set forth in claim 4, the lower extremity of said slide having an enlarged head thereon providing means for supporting said free ends of said arms in said last-named plane.

ADOLPH J. GRETSCHEL.

REFERENCES CITED

The following references are of record in the file of this patent:

UNITED STATES PATENTS

| Number | Name | Date |
| --- | --- | --- |
| 1,035,483 | Scott | Aug. 13, 1912 |
| 1,241,890 | Schrader | Oct. 2, 1917 |
| 1,333,618 | Heger Horst | Mar. 16, 1920 |
| 1,452,243 | Kahlow | Apr. 17, 1923 |